United States Patent
Kaplan

(10) Patent No.: US 12,506,559 B2
(45) Date of Patent: Dec. 23, 2025

(54) UNEVEN DATA PACKET SEGMENTATION AND ENCODING FOR IMPROVED TRANSMISSION OVER INTERMEDIATE LINK

(71) Applicant: Valens Semiconductor Ltd., Hod Hasharon (IL)

(72) Inventor: Elad Kaplan, Ness Ziona (IL)

(73) Assignee: Valens Semiconductor Ltd., Hod Hasharon (IL)

( * ) Notice: Subject to any disclaimer, the term of this patent is extended or adjusted under 35 U.S.C. 154(b) by 398 days.

(21) Appl. No.: 18/354,338

(22) Filed: Jul. 18, 2023

(65) Prior Publication Data

US 2024/0348555 A1  Oct. 17, 2024

Related U.S. Application Data

(60) Provisional application No. 63/495,787, filed on Apr. 13, 2023.

(51) Int. Cl.

| | |
|---|---|
| *H04L 1/08* | (2006.01) |
| *G06F 13/38* | (2006.01) |
| *H04L 1/00* | (2006.01) |
| *H04L 43/106* | (2022.01) |
| *H04L 47/43* | (2022.01) |
| *H04N 21/4363* | (2011.01) |

(52) U.S. Cl.
CPC .............. *H04L 1/08* (2013.01); *G06F 13/382* (2013.01); *H04L 1/0041* (2013.01); *H04L 43/106* (2013.01); *H04L 47/43* (2022.05); *H04N 21/43635* (2013.01); *G06F 2213/0042* (2013.01)

(58) Field of Classification Search
None
See application file for complete search history.

(56) References Cited

U.S. PATENT DOCUMENTS

| | | |
|---|---|---|
| 7,283,541 B2 | 10/2007 | Michelson |
| 7,826,470 B1 | 11/2010 | Aloni |
| 8,576,843 B2 | 11/2013 | Drottar |
| 9,118,597 B2 | 8/2015 | Bugge |
| 9,264,368 B2 | 2/2016 | Swarbrick |
| 9,276,835 B2 | 3/2016 | Poole |
| 9,276,856 B2 | 3/2016 | Spencer |

(Continued)

OTHER PUBLICATIONS

Universal Serial Bus 3.2 Specification, Revision 1.1, Jun. 2022, USB 3.0 Promoter Group.

*Primary Examiner* — Anh Vu H Ly
(74) *Attorney, Agent, or Firm* — Active Knowledge Ltd.

(57) ABSTRACT

Embodiments for transmitting uneven segments of a data packet over an intermediate communication link are disclosed. One embodiment includes receiving a data packet by a first node, segmenting the data packet into N segments, such that the size of each of the last two segments is shorter than the average size of the previous (N−2) segments, encoding the segments such that the reliability of each of the last two segments is better than the average reliability of the previous (N−2) segments, and transmitting the segments to a second node over the intermediate communication link. In this way, the most latency-sensitive segments are shortened and encoded with better reliability than the average segment, thereby improving network performance and efficiency.

20 Claims, 10 Drawing Sheets

(56) References Cited

U.S. PATENT DOCUMENTS

| | | |
|---|---|---|
| 9,385,961 B2 | 7/2016 | Hiramoto |
| 9,584,407 B2 | 2/2017 | Martin |
| 9,917,787 B2 | 3/2018 | Rimmer |
| 9,977,745 B2 | 5/2018 | Florea |
| 10,432,553 B2 | 10/2019 | Tse |
| 10,511,522 B2 | 12/2019 | Sung |
| 10,708,190 B2 | 7/2020 | Huang-Fu |
| 10,735,992 B2 | 8/2020 | Park |
| 10,764,215 B2 | 9/2020 | Gunner |
| 11,089,603 B2 | 8/2021 | Emmanuel |
| 11,134,140 B2 | 9/2021 | Pope |
| 11,218,572 B2 | 1/2022 | Qi |
| 2007/0140359 A1* | 6/2007 | Ehret ............... H04L 65/762 375/246 |
| 2007/0156725 A1* | 7/2007 | Ehret ............... G10L 19/167 |
| 2008/0215317 A1* | 9/2008 | Fejzo ............... G10L 19/025 704/E19.044 |
| 2013/0282918 A1* | 10/2013 | De Vleeschauwer ............... H04N 21/8455 709/231 |
| 2018/0095915 A1 | 4/2018 | Prabhakar |
| 2020/0412659 A1 | 12/2020 | Arditti Ilitzky |
| 2024/0348866 A1* | 10/2024 | Kaplan ............... H04L 1/08 |

\* cited by examiner

UNEVEN DATA PACKET SEGMENTATION AND ENCODING FOR IMPROVED TRANSMISSION OVER INTERMEDIATE LINK

CROSS-REFERENCE TO RELATED APPLICATIONS

This application claims priority to U.S. Provisional Patent Application No. 63/495,787, filed Apr. 13, 2023.

BACKGROUND

Networks often involve transmitting data packets between nodes over one or more intermediate communication links. The data packets may have variable sizes depending on their type and payload. Some networks impose limitations on the maximum size of a data packet that can be transmitted without being divided into smaller units, which is known as the maximum transmission unit (MTU) of the network. If a data packet exceeds the MTU of the network, it has to be fragmented into smaller segments that can fit within the MTU, where fragmentation is the method of dividing a data packet into smaller units. Another method for dividing a data packet into smaller units is segmentation. Segmentation and fragmentation may have various benefits, such as increasing network efficiency and reducing latency. However, segmentation and fragmentation also introduce some challenges and drawbacks, such as increasing the transmission overhead when the data packet is segmented into too many segments.

One possible method for transmitting data packets over an intermediate communication link is cut-through switching. Cut-through switching is a technique for packet switching networks, wherein a switch starts forwarding segments of a data packet before receiving the whole data packet. The switch only needs to receive the header of the data packet to determine its destination address and outgoing interface, and then it can start transmitting the segments to the node on the other side of the intermediate communication link. Cut-through switching can reduce latency and improve throughput compared to store-and-forward switching that requires receiving and buffering the entire data packet before forwarding it. However, cut-through switching also has some disadvantages, such as increasing the transmission overhead when the data packet is segmented into too many segments. Therefore, there is a need for improved methods and systems for segmenting data packets before transmitting them over an intermediate communication link.

SUMMARY

For networks that support retransmission of segments segmented from packets, the time of receiving the last few segments (such as the last two segments) is more important than the time of receiving the first few segments (optionally excluding the first segment that carries the packet's header). Therefore, some of the embodiments described below utilize uneven segmentation and encoding, such that the last few segments are shorter and have better reliability than the first few segments generated from the same data packet. This ensures that the most latency-sensitive segments are shorter and are encoded with a better reliability compared to the average segment. Moreover, the uneven segmentation and encoding scheme increases the efficiency of this embodiment compared to prior art solutions that do not make the last few segments shorter and more reliable than the average segment, which possibly allows for higher throughput and lower latency. This is beneficial for applications that require low-latency data transmission and high reliability. Additionally, it also reduces the transmission overhead compared to solutions that make all the segments shorter and more reliable. Moreover, making the last few segments (such as the last two segments) shorter and more reliable can improve the communication network's performance and efficiency compared to other communication networks that just make the last segment shorter and more reliable.

One embodiment of a method for transmitting uneven segments of a data packet over an intermediate communication link includes the following steps: receiving a data packet by a first node; segmenting the data packet into N segments, such that the size of each of the last two segments is shorter than the average size of the previous (N−2) segments; encoding the segments such that the reliability of each of the last two segments is better than the average reliability of the previous (N−2) segments; and transmitting the segments, over an intermediate communication link, to a second node.

BRIEF DESCRIPTION OF THE DRAWINGS

The embodiments are herein described, by way of example only, with reference to the accompanying drawings. No attempt is made to show structural details of the embodiments in more detail than is necessary for a fundamental understanding of the embodiments. In the drawings.

DETAILED DESCRIPTION

The term "network" refers to one or more communication links (including just one point-to-point link). Examples of networks include one or more HDBaseT links, one or more Ethernet links, Peripheral Component Interconnect (PCI), Peripheral Component Interconnect Express (PCIe), and Universal Serial Bus (USB).

The term "node" refers to a device coupled to a network, such as a redistribution point or a communication endpoint.

For example, a node may include, or be included in, one or more of the following devices: a gateway, a switch, a router, a protocol converter, an HDBaseT Adaptor (also known as HDBaseT T-Adaptor, which converts a protocol, interface, and/or application data representation to HDBaseT data representation and vice versa), a USB port, a Camera Serial Interface (CSI) port, a PCI port, and a PCIe port.

The term "port" refers to any type of access to or access from a network, including any type of network interface having any suitable hardware, firmware, and/or software construction. Examples of relevant ports include a USB port, a CSI port, a PCI port, and a PCIe port.

The term "USB port" refers to any type of access to or from a USB system, circuit, host, device, hub, or repeater, including any type of a USB interface having any hardware, firmware, and/or software construction equivalent to a USB Tx port and a USB Rx port. The terms "USB3" and "USB3.x" refer to any one of the USB3.0, USB3.1, and USB3.2 standards.

The term "Network cut-through" refers to a method of data transmission that allows a node (such as a network switch, a network gateway, and/or an HDBaseT Adaptor) to begin forwarding segments of a data packet before completely receiving the data packet. The transmitted segments are reassembled (by the receiving node or by a device that receives the segments from the receiving node) into a restored data packet. The restored data packet may or may not be identical to the original data packet, however the restored data packets should include the content of the payloads of the original data packets. In certain scenarios, network cut-through can reduce the latency incurred by the node by alleviating the need to store the entire data packet in its buffer before beginning to forward it.

Figure 1:
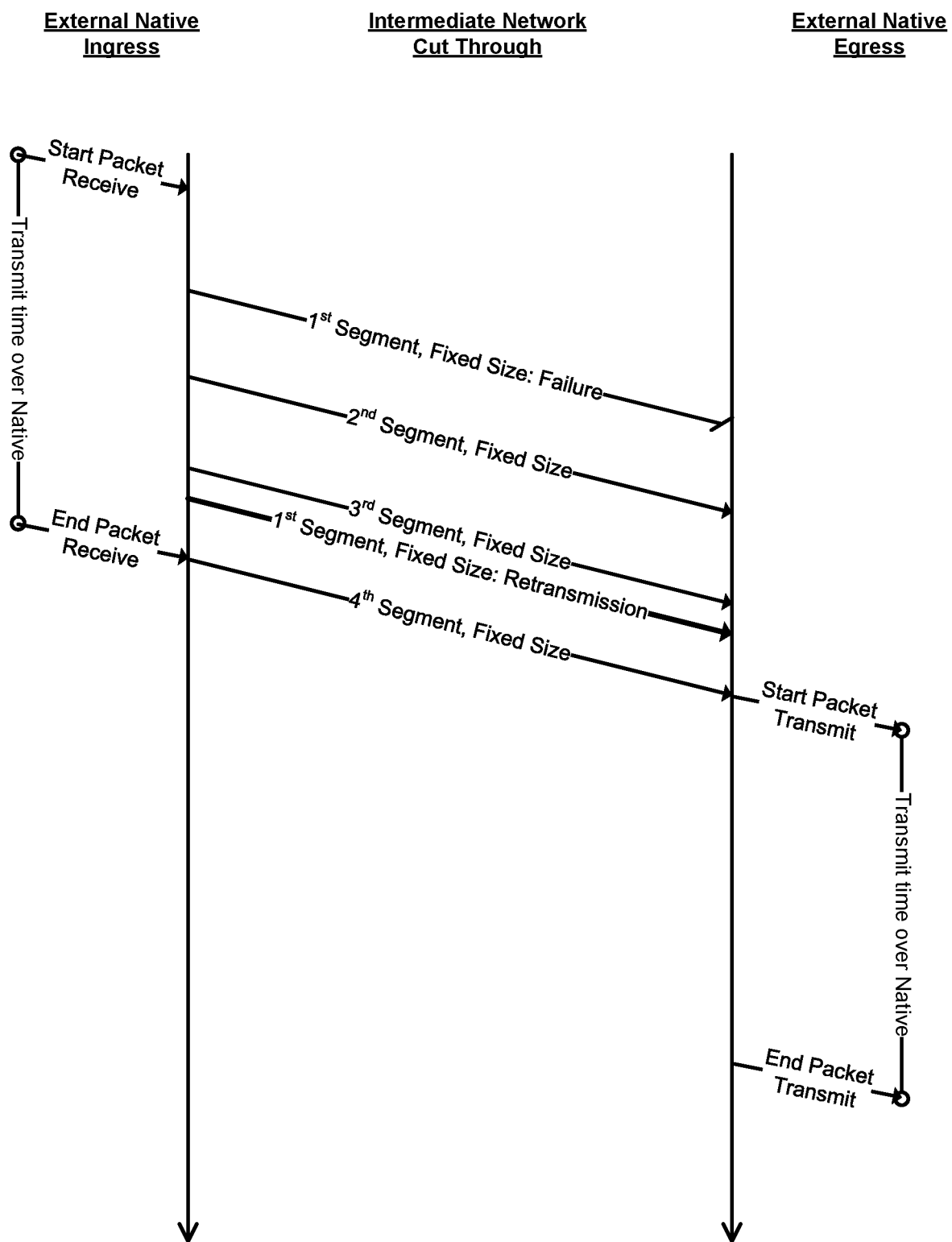
FIG. 1 illustrates sending segments of fixed size over an intermediate network utilizing cut-through and having a much larger bandwidth (compared to the external native ingress), which enables it to complete the retransmission of the first failed segment without increasing the total latency of delivering the data packet.
Figure 2:
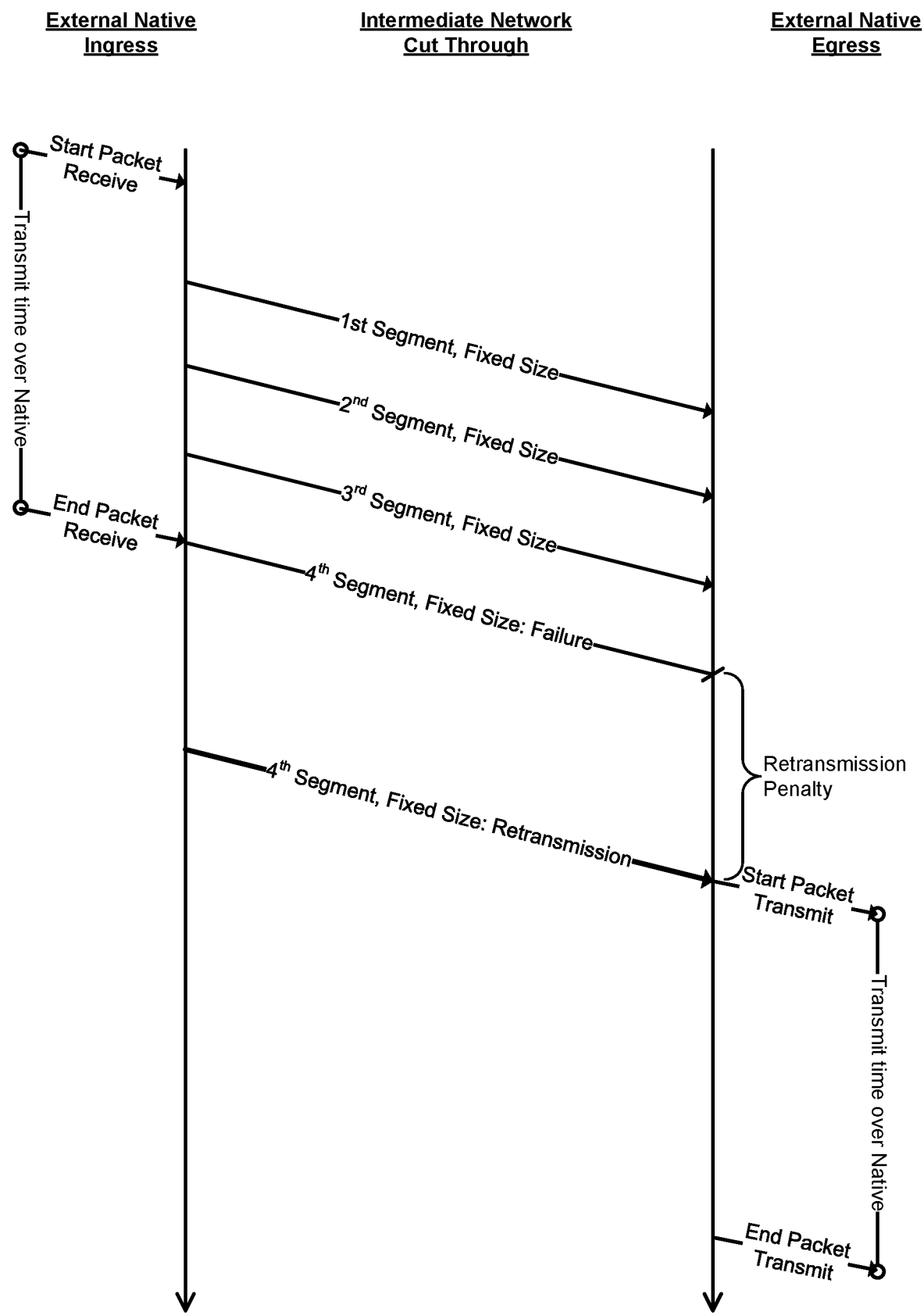
FIG. 2 illustrates the large retransmission penalty accumulated as a result of having to retransmit the last fixed size segment.

FIG. 1 illustrates sending segments of fixed size over an intermediate network utilizing cut-through and having a much larger bandwidth (compared to the external native ingress), which enables it to complete the retransmission of the first failed segment without increasing the total latency of delivering the data packet. FIG. 2 illustrates the large retransmission penalty accumulated as a result of having to retransmit the last fixed size segment. The retransmission penalty decreases as the length of the fixed sized segments decreases. However, the downside of decreasing the length of the fixed sized segments is that the segmentation overhead increases.

Figure 3:
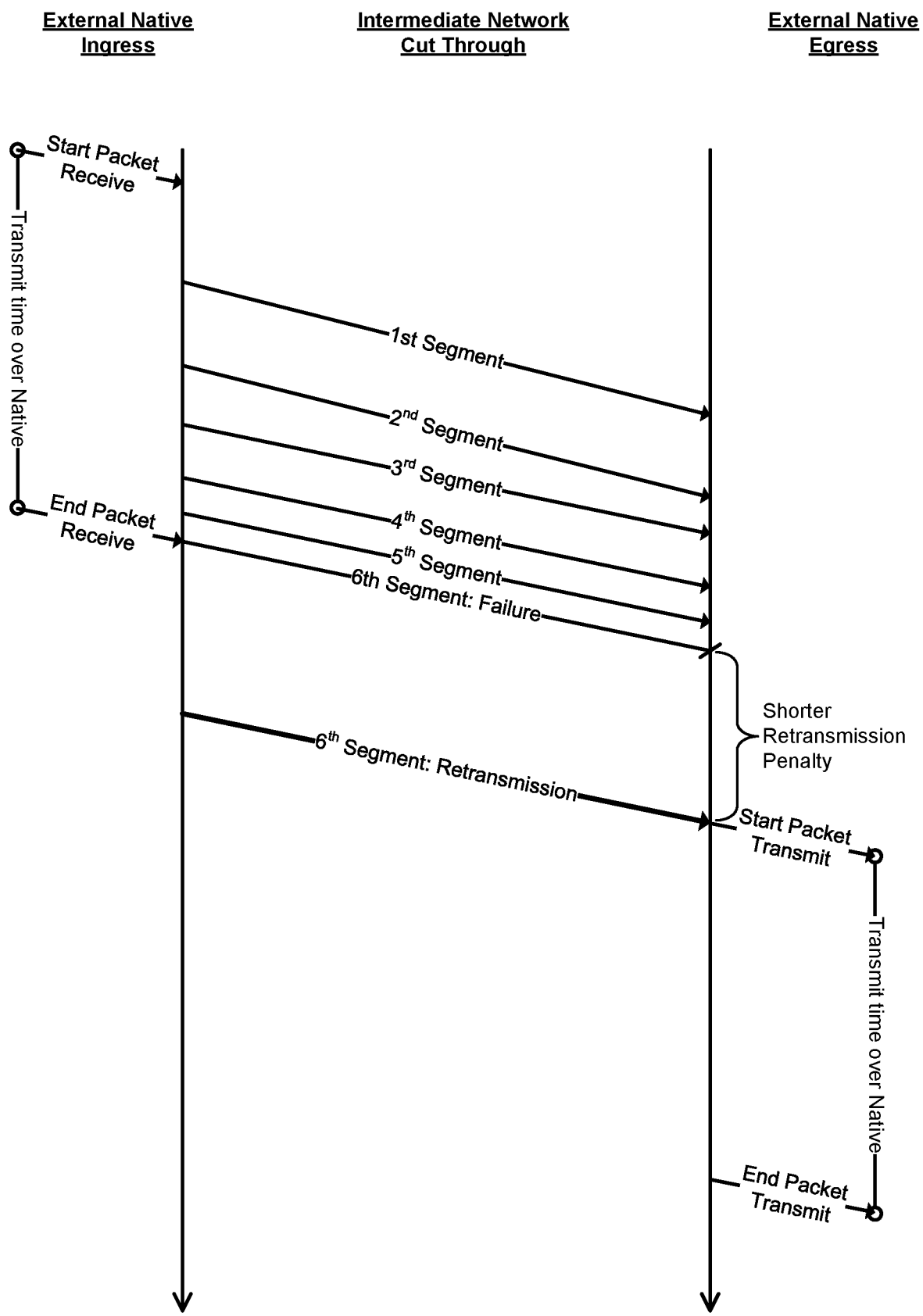
FIG. 3 illustrates the shorter retransmission penalty accumulated as a result of having to retransmit the last short segment (the $6^{th}$ segment in the drawing)

The problem of selecting the right length for the fixed sized segments is solved by the novel embodiment of transmitting uneven segments, wherein the average size of the last few segments is lower than the average size of the first few segments (generated from the same data packet). FIG. 3 illustrates the shorter retransmission penalty accumulated as a result of having to retransmit the last short segment (the 6th segment in the drawing) when utilizing the uneven segments compared to utilizing the fixed sized segments. Utilizing uneven segments reduces the segmentation overhead compared to utilizing short fixed sized segments, and reduces the transmission latency of the last few short segments compared to utilizing long fixed size segments, which improves the performance of the protocol and increases the throughput of the communication link. The slopes of the arrows illustrating the transmissions of the segments in FIG. 3 decrease towards the end of the packet because the last segments (such as the fifth and sixth segments) are shorter than the first segments (such as the first and second segments), which affect their transmission latencies because shorter segments result in shorter latencies.

Figure 4:
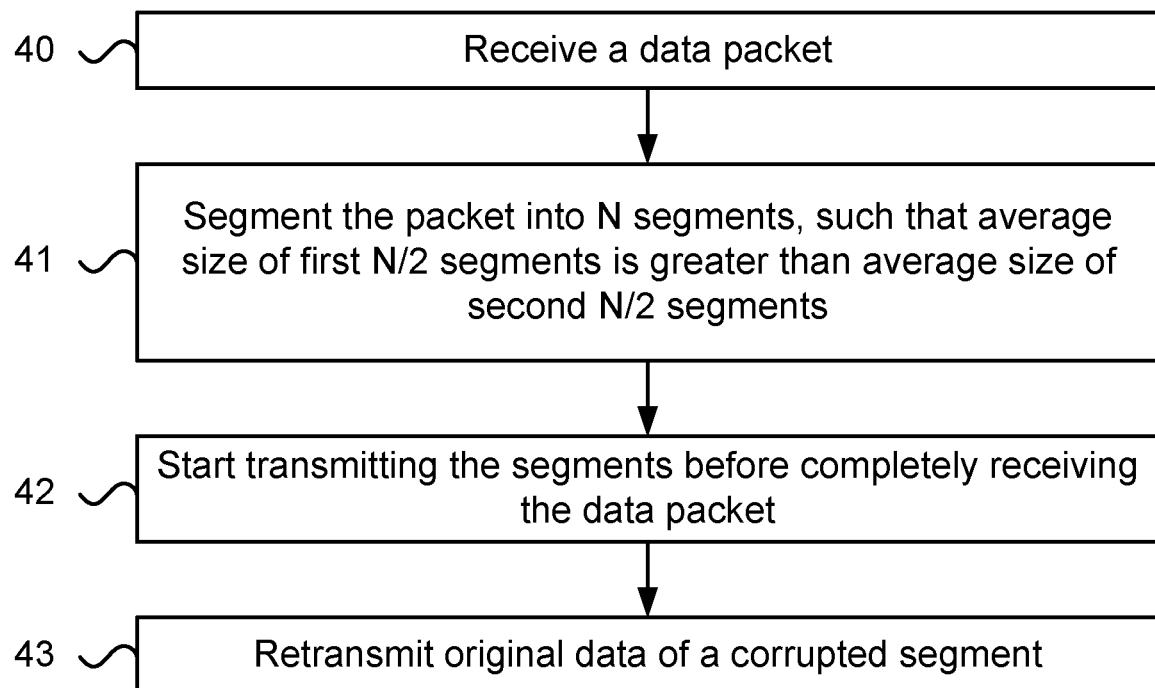
FIG. 4 illustrates one embodiment of a method for transmitting, over an intermediate communication link, uneven segments segmented from a data packet.

FIG. 4 illustrates one embodiment of a method for transmitting, over an intermediate communication link, uneven segments segmented from a data packet. The method includes the following steps. In step 40, receiving the data packet by a first node from a first communication port, such as a USB port.

In step 41, segmenting, by the first node, the data packet into N segments. The segmenting begins before completely receiving the data packet and is done unevenly, such that the average size of the first N/2 segments, excluding the first segment, is greater by more than 30% compared to the average size of the second N/2 segments, excluding the last segment. For example, assuming the data packet is a USB 3.0 bulk or isochronous transfer packet having a payload size of 1024 bytes plus 4 bytes CRC32 (total of 1028 bytes), and the segments are HDBaseT packets having the following packet sizes: 256 B, 256 B, 132 B, 128 B, 64 B, 64 B, 64 B, and 64 B. The first four HDBaseT packets, which form the first half of the segments, will have an accumulated payload size of 770 bytes, while the second four HDBaseT packets, which form the second half of the segments, will have an accumulated payload size of 256 bytes. This monotonic decreasing HDBaseT packet payloads reduces the total time required to transmit the packet over the HDBaseT link while retransmitting corrupted HDBaseT packets because both the probability of having a packet loss and the time it takes to perform a retransmission over the HDBaseT link are reduced with the reduction of the HDBaseT packet size towards the end of the segments segmented from the USB data packet.

In another example, the USB 3.0 data packet of total 1028 bytes is segmented into HDBaseT packets having the following packet sizes: 64 B, 256 B, 256 B, 132 B, 128 B. 64 B, 64 B, and 64 B. The term "average" is defined herein as arithmetic mean, thus, in this example, the average size of the first N/2 segments, excluding the first segment, is 215 B, which is significantly greater than the average size of the second N/2 segments, excluding the last segment, which is 85 B. This uneven packet segmentation reduces the total time required to retransmit a corrupted HDBaseT packet generated from a section located towards the end of the incoming USB data packet. It is noted that when the number of segments is not a multiple of two (or three in other examples), the average can be calculated as an arithmetic mean based on the bytes, with a floating-point number representing the segments.

In step 42, transmitting the segments over the intermediate communication link to a second node, wherein the transmitting begins before completely receiving the data packet. The intermediate communication link may be a point-to-point link and/or a network such as Ethernet, HDBaseT, Compute Express Link (CXL), or Wi-Fi. The segments may be transmitted in sequential or parallel order, depending on the characteristics of the intermediate network, and may be transmitted over one or more sets of wires and/or channels. In one example, the intermediate network is HDBaseT network, and the segmenting and reassembling of the segments is performed by the HDBaseT adapters that respectively send and receive the HDBaseT packets (which refer to the above-mentioned segments). The HDBaseT adapters may also be configured to handle errors and to retransmit lost and/or corrupted packets to improve the reliability of the data transmission.

And in step 43, responsive to detecting an indication indicative of a corrupted segment, retransmitting the original data of the corrupted segment to the second node. Detecting the indication indicative of the corrupted segment can be made explicitly or implicitly. One example of an explicit detection of the indication indicative of the corrupted segment includes receiving, by the first node from the second node, a NACK (Negative Acknowledgment), and then retransmitting one or more segments comprising the original data of the corrupted segment. One example of an implicit detection of the indication indicative of the corrupted segment includes not receiving an expected ACK by the first node, and then retransmitting one or more segments comprising the original data of the segment for which the ACK was not received. The original data to be retransmitted may be packaged in different forms, and sentences in the form of "retransmitting the original data of the corrupted segment" shall not limit the embodiments of segmenting, modulating and/or protecting the original data to be transmitted. As a few examples, the payload of the retransmitted segment may be identical to the payload of the corrupted segment, or the payload of the retransmitted segment may be modulated with a lower PAM modulation compared to the payload of the corrupted segment, or the original data of the corrupted segment may be transmitted in payloads of two or more segments that are modulated with either the same modulation as the corrupted segment or with a stronger modulation that is more resistant to interference.

Figure 5:
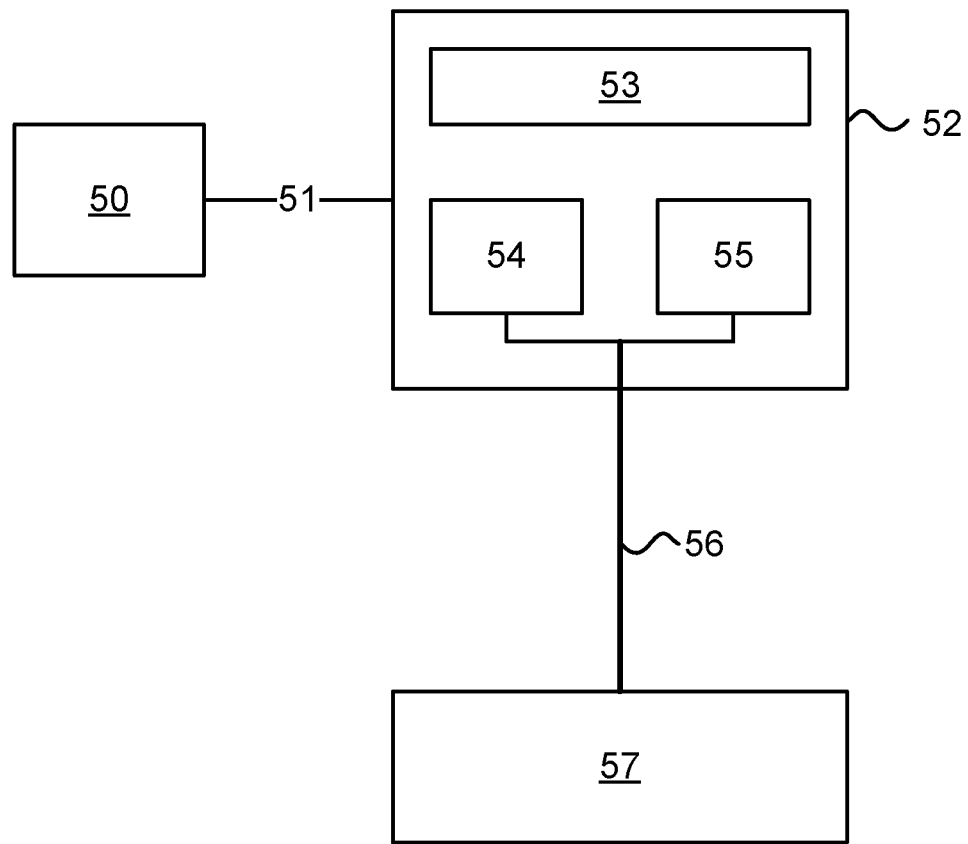
FIG. 5 illustrates one embodiment of a system capable of generating uneven segments.

FIG. 5 illustrates one embodiment of a system corresponding to the embodiment of the method illustrated in FIG. 4. The system includes at least a first node 52 comprising a processor 53, a transmitter 54, and a receiver 55. The processor 53 may belong to a computer that further includes a memory and a communication interface, such as the transmitter 54 and receiver 55. It is specifically noted that any pair of transmitter-receiver herein, such as transmitter 54 and receiver 55, may be implemented as a transceiver, and references herein to a transmitter and a receiver belonging to the save port may be equivalently implemented by a transceiver that is able to transmit and receive signals. The first node 52 is coupled to an intermediate communication link 56, such as HDBaseT, and the intermediate communication link 56 is coupled to a second node 57. In a similar manner to combining the transmitter and the receiver into a transceiver, it is also possible to implement the intermediate communication link 56 as a bidirectional communication link or as at least two unidirectional communication links. For the purpose of the embodiments disclosed herein, a transmitter-receiver pair (belonging to the same device) may be equivalent to a transceiver, and a bidirectional communication link may be equivalent to two or more unidirectional communication links. The first node, utilizing processor 53, is configured to receive a data packet, and to segment the data packet into N segments such that the average size of the first N/2 segments, excluding the first segment, is greater than the average size of the second N/2 segments, excluding the last segment. In one example, the first node, utilizing processor 53, receives the data packet from communication device 50 (such as a USB3 port) over communication link 51 (such as a USB3 cable). In another example, the first node, utilizing processor 53, reads the data packet from a memory unit. The first node, utilizing transmitter 54, is configured to transmit the segments over the intermediate communication link 56 to the second node 57. The first node 52 is configured to begin transmitting the segments to the second node 57 before the processor 53 completely received the data packet (from which the segments are segmented) in order to reduce the accumulated delay. And the first node 52 is further configured to detect an indication indicative of a corrupted segment, and to retransmit the original data of the corrupted segment to the second node 57. As discussed above, the detecting of the indication indicative of the corrupted segment may be made explicitly or implicitly, and the original data for the retransmission may be packaged as the original segment was packaged, or in a more robust packaging that may use a more robust modulation.

The above method and system may be implemented as a corresponding non-transitory computer readable medium storing one or more computer programs. The non-transitory computer readable medium storing one or more computer programs is configured to cause a processor-based system to execute steps comprising: receiving a data packet by a first node; segmenting, by the first node, the data packet into N segments such that average size of first N/2 segments, excluding the first segment, is greater by more than 30% compared to average size of second N/2 segments, excluding the last segment; transmitting the segments over an intermediate communication link to a second node, wherein the transmitting begins before completely receiving the data packet; and responsive to detecting an indication indicative of a corrupted segment, retransmitting original data of the corrupted segment.

Due to the shorter average size of the second N/2 segments compared to the first N/2 segments, the average retransmission latency of a segment selected from the second N/2 segments is shorter than the average retransmission latency of a segment selected from the first N/2 segments, which reduces the retransmission penalty by reducing the total forwarding time of the data packet over the intermediate communication link when there is a need to perform a retransmission.

The second node reassembles a restored data packet from the received segments. As explained above, the restored data packets may or may not be identical to the data packet received by the first node, however the aggregated data payloads of the restored data packets should include the content of the aggregated data payloads of the received data packets. In one example, the restored data packet, or just its payload, is identical to the received data packet, or to the payload of the received data packet, respectively. In another example, the difference between the header of a restored data packet and the header of its corresponding (received) data packet is limited to a difference that does not affect the usability of the payload, carried by the data packet, by an end device. More specifically, the difference may result from the need to adjust a field such as time stamp, or from the need to hide the existence of the intermediate network from the end device. The second node may forward the restored data packet to a second communication port, which may be a device or a network.

Optionally, the transmitter of the first node, which transmits the segments over the intermediate communication link, stores a temporary copy of the segments for possible retransmission after detecting one or more corrupted packets. Reducing the length of the segments towards the end of the segmented packets reduces the overall latency and improves the efficiency of data transfer, because the shorter the segment the shorter its retransmission time.

Additionally or alternatively, uneven segmentation of the data packet into multiple segments with a (generally) decreasing payload size results in the last segments having a shorter payload compared to at least some of the first segments that were segmented from the same data packet. The shorter sizes of the last segments reduce their processing time, which in turn reduce the total forwarding time of the data packet over the intermediate communication link, which leads to a reduction in the overall latency and to an improved data transfer efficiency.

In one example, the system segments the data packet into multiple segments having a monotonically decreasing size, or a generally monotonically decreasing size. Monotonically decreasing size means that the payload size of each subsequent segment is shorter than the payload size of its previous segment. The term "generally monotonically decreasing size" refers to a series that is mostly monotonically decreasing, such as segmenting the data packet into multiple segments having a monotonically decreasing size apart from the first segment that is made short because it carries the header of the data packet. By segmenting the data packet this way, this example takes advantage of the fact that shorter packets can be processed more quickly and efficiently than larger packets, which results in improved efficiency of data transfer and reduced overall latency.

The following are further options and alternatives for the above embodiment of segmenting the data packet into uneven segments. Optionally, the shorter average size of the segments that are included in the second N/2 segments, relative to the average size of the segments that are included in the first N/2 segments, causes the average retransmission latency of a segment selected from the second N/2 segments to be shorter than the average retransmission latency of a segment selected from the first N/2 segments. This reduces the total forwarding time of the data packet over the intermediate communication link when there is a need to perform a retransmission.

Optionally, the average size of the first N/3 segments (segmented from the data packet) excluding the first segment, is greater by more than 50% compared to the average size of the third N/3 segments, excluding the last segment. Additionally or alternatively, the average size of the first N/3 segments, excluding the first segment, may be greater by more than 25% compared to the average size of the second N/3 segments, and the average size of the second N/3 segments may be greater by more than 25% compared to the average size of the third N/3 segments, excluding the last segment. Still additionally or alternatively, the average size of the first N/3 segments (including the first segment) may be greater than the average size of the second N/3 segments, that may be greater than average size of third N/3 segments (including the last segment). Optionally, the bandwidth of the intermediate communication link is high enough, and its length is short enough (such as between 10 and 50 meters), to ensure that the first retransmission of any of the first N/4 segments, and/or optionally also any retransmission of the first N/2 segments, is completed before the transmission of the last segment begins.

Optionally, the embodiment further includes reassembling a restored data packet from the segments, and transmitting the restored data packet to its destination. Optionally, the embodiment of segmenting the data packet into uneven segments further includes determining the size of at least the last two segments of the data packet based on bit error rate (BER) of the intermediate communication link, such that the last two segments are shorter when the BER is above a predetermined threshold compared to when the BER is below the predetermined threshold. Examples of such predetermined thresholds may include BER of about 0.1%, 0.01%, or 0.001%. Optionally, a more advanced implementation may include two or more thresholds, such that a certain number of the last segments (e.g., the last two segments) are shorter when the BER is above a first predetermined threshold (e.g., 0.1% or 0.01%), compared to when the BER is below a second predetermined threshold (e.g., 0.001% or 0.0001%). Setting the length of the last segments based on the BER can improve the performance of the communication link because a higher BER increases the likelihood of errors during transmission, and shorter segments are less likely to accumulate errors. Therefore, by adjusting the size of the last segments based on the BER, it may be possible to improve the efficiency of the data transfer and to reduce the overall latency. In other words, by adjusting the size of the last segments based on the BER, the system may be able to optimize the transmissions of the segments to minimize its latency and/or reduce the impact of network congestion. As used herein, bit error rate (BER) is the number of bit errors per unit of time. The number of bit errors is the number of received bits of a data stream over a communication link that has been altered due to noise, interference, distortion, bit synchronization errors, etc. An essentially equivalent calculation may utilize packet error rate (PER) for setting the lengths of the last segments.

Optionally, the embodiment of segmenting the data packet into uneven segments further includes determining the length of a certain number of the last segments (such as the last two or three segments) of the data packet based on propagation latency of the intermediate communication link. For example, when the propagation latency exceeds a predetermined threshold (such as 50, 100, or 150 nanoseconds), the last segments are made shorter compared to when the propagation latency is shorter than the predetermined threshold. Additionally or alternatively, the determining of the length of the certain number of the last segments may be performed utilizing an adaptive algorithm having more than one threshold. For example, when the propagation latency exceeds 150 nanoseconds, the last two segments are made shorter compared to when the propagation latency is below 50 nanoseconds. Determining the length of the certain number of the last segments based on the propagation latency of the intermediate communication link may improve its performance because a higher propagation latency increases the time it takes for the segments to traverse the communication link, and shorter segments can be transmitted and retransmitted more quickly. Therefore, by adjusting the size of the segments based on the propagation latency, the efficiency of the data transfer may be improved, and the overall latency may be reduced. In other words, by adjusting the size of the payloads of the last segments based on the propagation latency, the system may be able to optimize the transmissions of the segments to minimize its latency and/or reduce the impact of network congestion. As used herein, propagation latency is the time it takes a signal to traverse a communication medium. For example, a ten meters cable having a velocity factor of about 0.65 has a propagation latency of about 50 nanoseconds.

In a first example, the embodiment of segmenting the data packet into uneven segments includes a system where the first and second communication ports are USB3 ports, the received data packet is a USB data packet of about 1 KB, the intermediate communication link comprises an HDBaseT link, and the segments refer to HDBaseT packets. The data packet is segmented into at least six HDBaseT packets to take advantage of the above-described benefits of packet segmentation having a (generally) decreasing size, which improves the efficiency of data transfer and reduces overall latency. For example, a USB3.x data packet may be segmented into about seven HDBaseT packets having payload sizes of about ±20% of the following byte sizes: 28, 252, 252, 204, 144, 96, and 64.

In a second example, the embodiment includes a system where the first and second communication ports are USB3 ports, the received data packet is a USB data packet of about 1 KB, the intermediate communication link comprises an Ethernet link, and the segments refer to Ethernet packets. The data packet is segmented into at least four Ethernet packets to take advantage of the above-described benefits of packet segmentation, which improves the efficiency of data transfer and reduces the overall latency.

In a third example, the embodiment includes a system where the first and second communication ports are selected from USB3 or Camera Serial Interface (CSI) communication ports, the intermediate communication link comprises a Compute Express Link (CXL), and the segments refer to CXL packets. The data packet is segmented into multiple CXL packets to take advantage of the benefits of the above-described packet segmentation, which improves the efficiency of data transfer and reduces the overall latency.

In a fourth example, the embodiment includes a system where the first and second communication ports are selected from USB3 or Camera Serial Interface (CSI) communication ports, the intermediate communication link comprises a Peripheral Component Interconnect Express (PCIe), and the segments refer to PCIe packets. The data packet is segmented into multiple PCIe packets to take advantage of the benefits of the above-described packet segmentation, which improves the efficiency of data transfer and reduces the overall latency.

Figure 6:
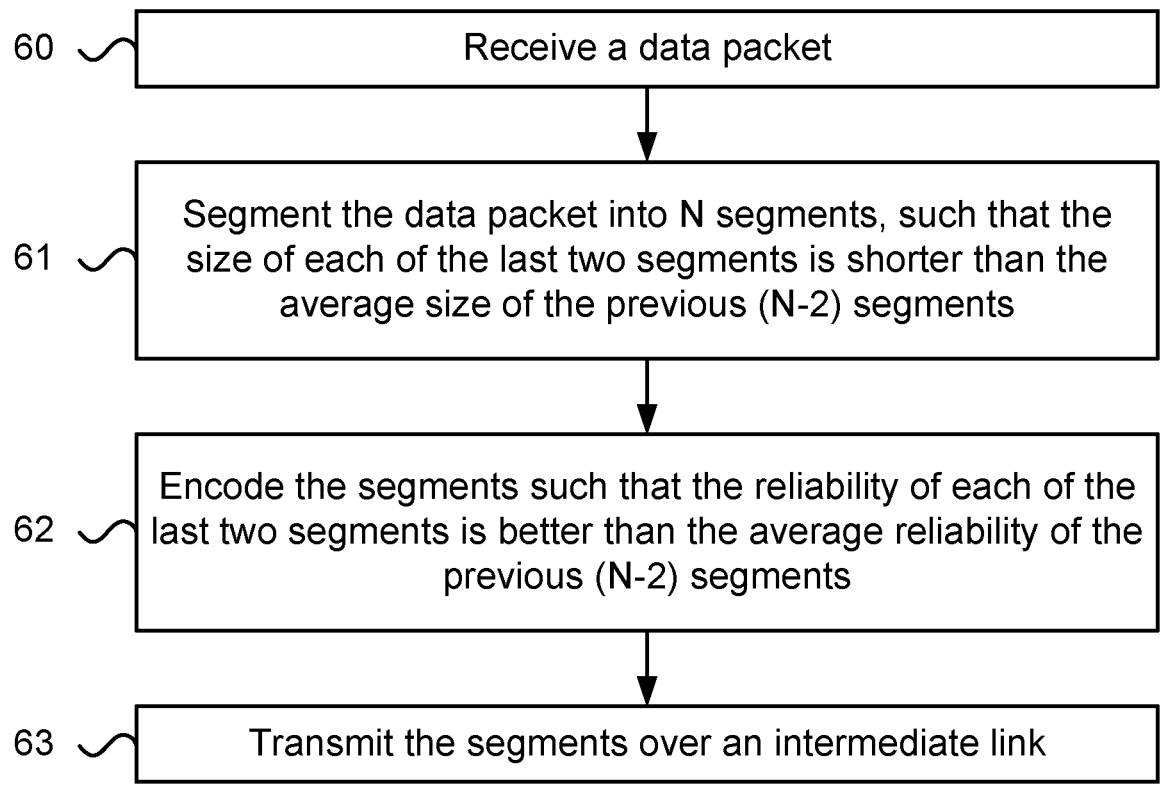
FIG. 6 illustrates one embodiment of a method for transmitting, over an intermediate communication link, uneven segments segmented from a data packet.

FIG. 6 illustrates one embodiment of a method for transmitting, over an intermediate communication link, uneven segments segmented from a data packet. The method includes the following steps: In step 60, receiving a data packet by a first node. In step 61, segmenting the data packet into N segments, such that the size of each of the last two segments is shorter than the average size of the previous (N−2) segments. In step 62, encoding the segments such that the reliability of each of the last two segments is better than the average reliability of the previous (N−2) segments. And in step 63, transmitting the segments, over an intermediate communication link, to a second node. In some prior art references, the header and tail of the packet are more important than the payload, and thus the header and tail are encoded with better reliability compared to the payload. In other prior art references, the payloads of some packets are more important than the payloads of other packets, and thus the more important payloads are encoded with better reliability compared to the less important payloads. However, this embodiment is different from the prior art because, especially when the first and second nodes support retransmission, the time of receiving by the second node the last few segments (such as the last two segments) is more important than the time of receiving the first few segments (optionally excluding the first segment that carries the packet's header). Therefore, the last few segments in this embodiment (such as the last two segments) are encoded with a better reliability than the first few segments (such as the first half of the segments, possibly excluding the first segment that carries the packet's header), and the average size of each of the last few segments is shorter than the average size of the first few segments.

Data packets having different priorities refer to the ability to assign different levels of importance to different types of traffic or applications. For example, in Ethernet this is done by assigning a priority value to each packet, which is then used by the network to determine how to handle the packet. The reference to average reliability of a set of segments may be calculated by multiplying the size (in bytes) of each segment in the set by a number representing the reliability of each segment, and dividing the result by the total size (in bytes) of the segments. For example, assuming a 1024 bytes USB 3.0 data packet is segmented into HDBaseT packets having the following packet sizes: 64 B, 256 B, 192 B, 128 B, 128 B, 64 B, 64 B, 64 B, and 64 B (sizes refer to the payloads), having the following corresponding PAM modulations: PAM4, PAM8, PAM8, PAM8, PAM8, PAM8, PAM8, PAM4, and PAM4. Then the average reliability of the first seven segments is (64*4+256*8+192*8+128*8+128*8+64*8+64*8)/(64+256+192+128+128+64+64)=7.71 which is worser than the reliability of each of the last two segments (that is 4 in this example). However, if the corresponding PAM modulations of the last two segments were PAM8 and PAM4, then the reliability of each of the last two segments is not better than the average reliability of the other segments, because the reliability of the segment immediately preceding the last segment is 8, which is worser than 7.71. Optionally, the first node receives a stream of data packets having the same priority, and each data packet is segmented into N segments according to the above-described uneven segmentation.

Figure 7:
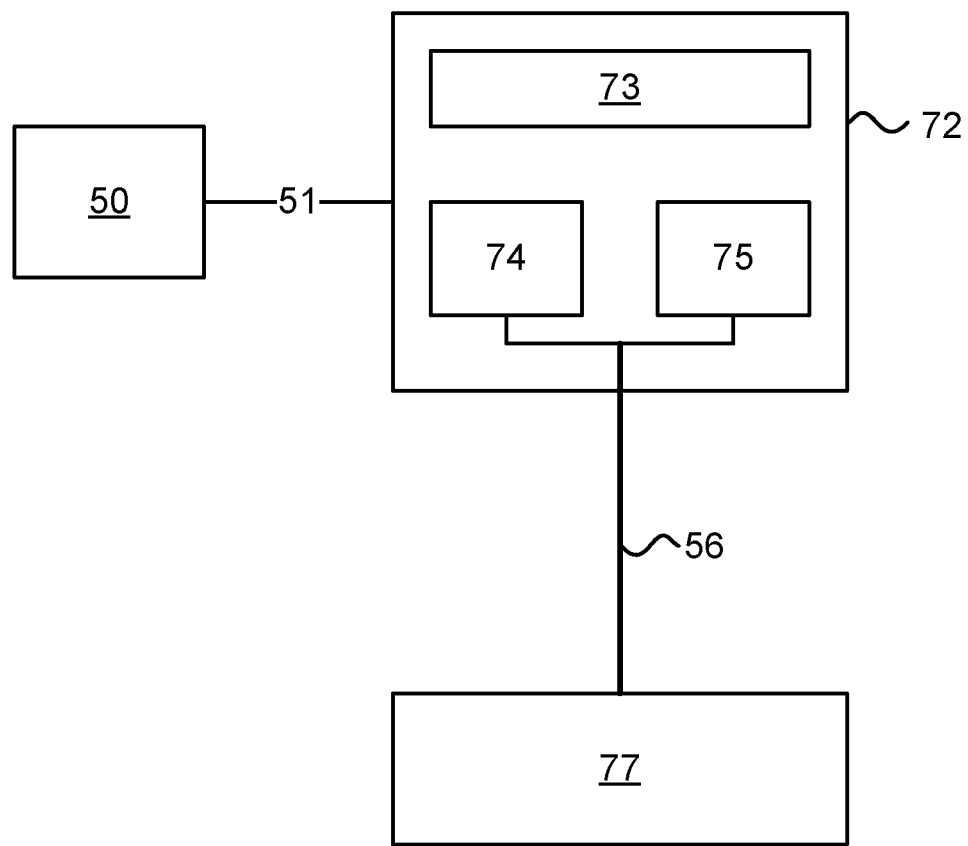
FIG. 7 illustrates one embodiment of a system capable of generating uneven segments.

FIG. 7 illustrates one embodiment of a system corresponding to the embodiment of the method illustrated in FIG. 6. The system includes at least a first node 72 comprising a processor 73 and a transmitter 74. The processor 73 may belong to a computer that further includes a memory and a communication interface, such as the transmitter 74. The first node 72 is coupled to an intermediate communication link 56, such as HDBaseT, and the intermediate communication link 56 is coupled to a second node 77. The first node, utilizing processor 73, is configured to segment the data packet into N segments, such that the size of each of the last two segments is shorter than the average size of the previous (N−2) segments. The first node, utilizing processor 73, is further configured to encode the segments such that the reliability of each of the last two segments is better than the average reliability of the previous (N−2) segments. The first node, utilizing transmitter 74, is configured to transmit the segments, over the intermediate communication link 56, to the second node 77. Optionally, the first node 72 further includes a receiver 75, and is further configured to detect an indication indicative of a corrupted segment, and to retransmit to the second node 77 the original data of the corrupted segment upon detecting the indication, which may be explicit or implicit as discussed above.

The above method and system may be implemented as a corresponding non-transitory computer readable medium storing one or more computer programs. The non-transitory computer readable medium storing one or more computer programs is configured to cause a processor-based system to execute steps comprising: receiving a data packet by a first node; segmenting the data packet into N segments, such that size of each of the last two segments is shorter than average size of the previous (N−2) segments; encoding the segments such that reliability of each of the last two segments is better than average reliability of the previous (N−2) segments; and transmitting the segments, over an intermediate communication link, to a second node.

The embodiments related to FIG. 6 and FIG. 7 may have various variations and/or additions, such as the following. Optionally, the first and second nodes support retransmission, and the reliability of each of the last three segments is better than average reliability of the previous (N−3) segments, and the size of each of the last three segments is shorter than the average size of the previous (N−3) segments. Optionally, the average size of the first N/3 segments, excluding the first segment, is greater by more than 50% compared to the average size of the third N/3 segments, excluding the last segment. Optionally, the average size of the first N/3 segments, excluding the first segment, is greater by more than 25% compared to the average size of the second N/3 segments, that is greater by more than 25% compared to average size of third N/3 segments, excluding the last segment. As discussed above, the term "average" refers to arithmetic mean, therefore, for the purposes of calculating the average size of a third of the segments it is not required for the total number of segments to be a multiple of three. Additionally or alternatively, optionally, the average size of the first N/3 segments is greater than the average size of the second N/3 segments, that is greater than the average size of the third N/3 segments. Still additionally or alternatively, optionally, the average reliability of the first N/3 segments, excluding the first segment, is worser than the average reliability of the second N/3 segments, that is worser than the average reliability of the third N/3 segments, excluding the last segment. Optionally, the first node is further configured to begin the transmission of the segments before completely receiving the data packet in order to reduce the latency accumulated over the intermediate communication link. Additionally, the first node may further include a receiver, and the first node may be further configured to: detect an indication indicative of a corrupted segment, and retransmit to the second node the original data of the corrupted segment upon detecting the indication. Optionally, the second node reassembles a restored data packet from the segments, and forwards the restored data packet to its destination after receiving the last segment. Optionally, the length of the intermediate communication link is between 10 and 50 meters, and the bandwidth of the intermediate communication link is high enough to ensure that the first retransmission of the first segment (from the N segment) is completed before beginning the transmission of the last segment (from the same N segments). And optionally, the first node may be a first HDBaseT adaptor configured to receive a stream of USB3.x data packets having the same priority, and to segment each of the USB3.x data packets into N segments. The second node would be a second HDBaseT adaptor configured to reassemble the received segments into a stream of USB3.x data packets, and to forward the stream of USB3.x data packets to a USB port.

Figure 8:
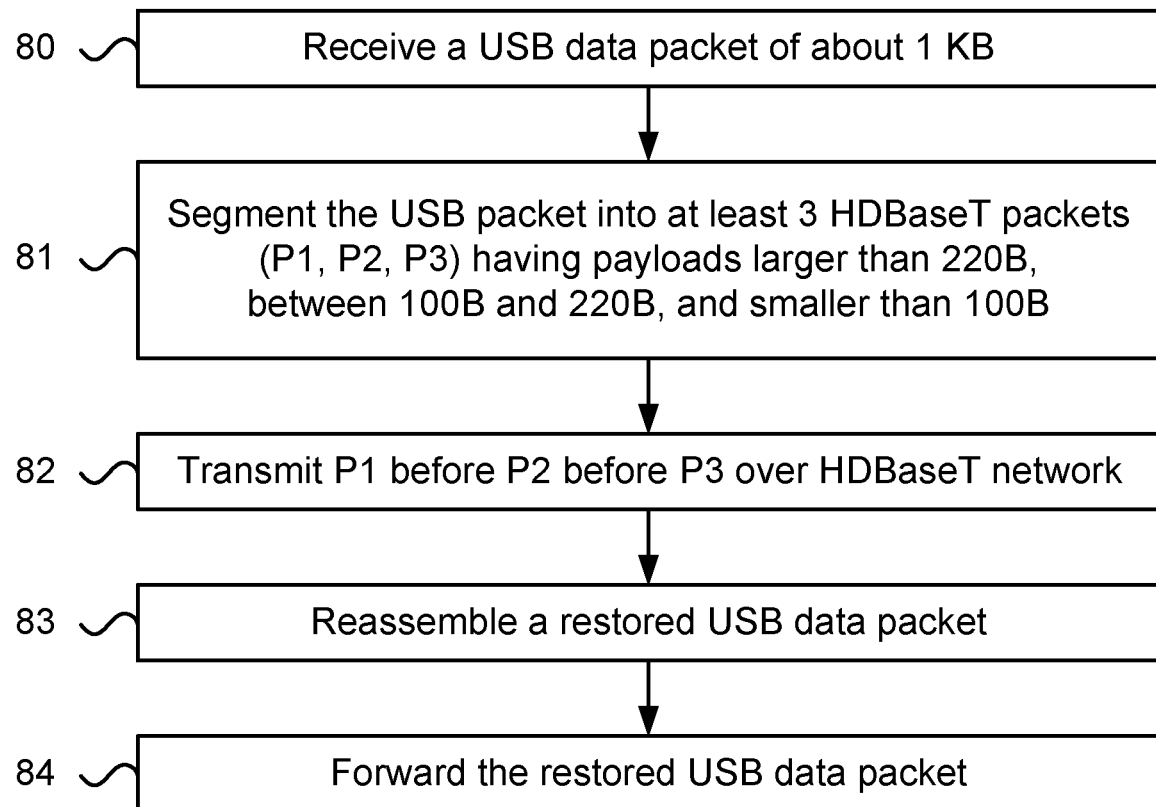
FIG. 8 illustrates one embodiment of a method for transmitting USB packets over an HDBaseT network.

FIG. 8 illustrates one embodiment of a method for transmitting USB packets over an HDBaseT network. The method includes the following steps. In step 80, receiving from a first USB port a USB data packet of about 1 Kilobyte. In step 81, segmenting the USB data packet into multiple HDBaseT packets. The segmentation is performed such that the HDBaseT packets have various sizes, which are generally decreasing. For example, in one embodiment, the HDBaseT packets, which are segmented from a single ~1 KB USB data packet, include three packets (P1, P2, P3) having payload sizes of more than 220 bytes, between 100 and 220 bytes, and below 100 bytes, respectively. The division of the HDBaseT packets in this way reduces the overall latency during retransmission events. In step 82, transmitting the HDBaseT packets over the HDBaseT network, such that P1 is sent before P2, and P2 is sent before P3. The multiple HDBaseT packets usually include more than three HDBaseT packets, and the transmission of the HDBaseT packets over the HDBaseT network is generally performed according to the packet size, excluding the first packet which may be shorter in order to better protect the header of the USB data packet. However, transmitting according to packet size is not mandatory as long as most of the large packets are sent at the beginning, and the last few packets are mostly short packets. In step 83, reassembling a restored USB data packet from the transmitted HDBaseT packets. Once the HDBaseT packets are transmitted over the HDBaseT network, the transmitted HDBaseT packets are reassembled into a restored USB data packet, which may or may not be identical to the received USB data packet, as long as the restored USB data packets include the data payloads carried by the received USB data packets. And in step 84, forwarding the restored USB data packet to a second USB port.

Figure 9:
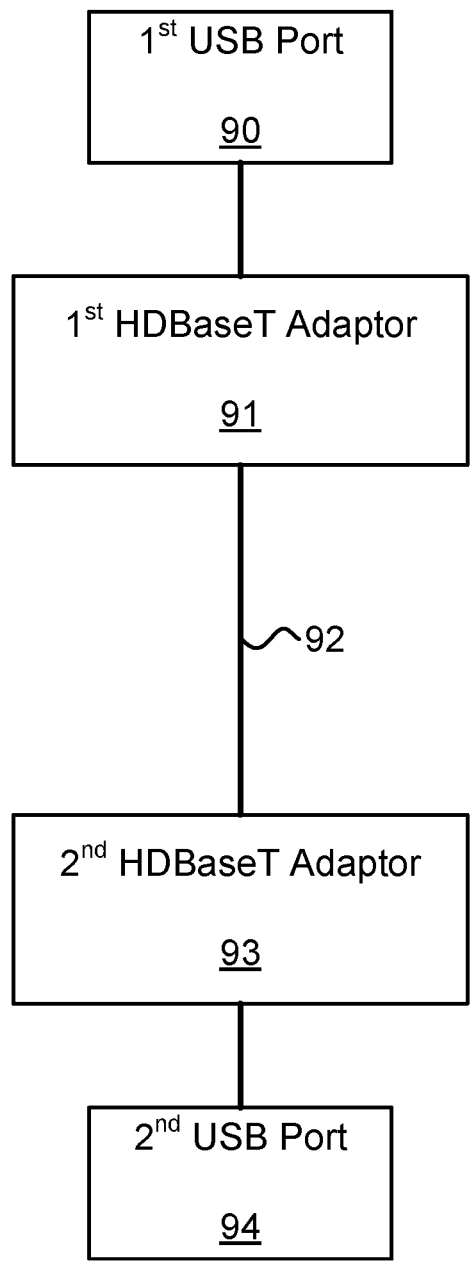
FIG. 9 illustrates one embodiment of a HDBaseT network.

FIG. 9 illustrates one embodiment of a system corresponding to the embodiment of the method illustrated in FIG. 8. The system includes a network comprising: first and second USB ports (90, 94), first and second HDBaseT adaptors (91, 93), and an HDBaseT network 92. The first HDBaseT adaptor 91 is configured to receive from a first USB port a USB data packet of about 1 Kilobyte, and to segment the USB data packet into multiple HDBaseT packets. The HDBaseT packets include at least three packets (P1, P2, P3) having payload sizes of more than 220 bytes, between 100 and 220 bytes, and below 100 bytes, respectively. The first HDBaseT adaptor 91 is further configured to transmit the HDBaseT packets over the HDBaseT network 92 to the second HDBaseT adaptor 93, such that P1 is sent before P2, and P2 is sent before P3. The second HDBaseT adaptor 93 is configured to reassemble a restored USB data packet from the transmitted HDBaseT packets, and to forward the restored USB data packet to the second USB port 94.

The above method and system may be implemented as a corresponding non-transitory computer readable medium storing one or more computer programs. The non-transitory computer readable medium storing one or more computer programs is configured to cause a processor-based system to execute steps comprising: Receiving from a first USB port a USB data packet of about 1 Kilobyte. Segmenting the USB data packet into multiple HDBaseT packets, wherein the HDBaseT packets comprise at least three packets (P1, P2, P3) having payload sizes of more than 220 bytes, between 80 and 220 bytes, and below 80 bytes, respectively. Transmitting the HDBaseT packets over an HDBaseT network, such that P1 is sent before P2, and P2 is sent before P3. Reassembling a restored USB data packet from the transmitted HDBaseT packets. And forwarding the restored USB data packet to a second USB port.

The embodiments related to FIG. 8 and FIG. 9 may have various variations and/or additions, such as the following. Optionally, the first HDBaseT adaptor is configured to begin segmenting the USB data packet into the multiple HDBaseT packets before completely receiving the USB data packet.

Optionally, the first HDBaseT adaptor is configured to segment the USB data packet into between 6 and 12 HDBaseT packets, from which at least three HDBaseT packets have payload sizes below 100 bytes, and at least two HDBaseT packets have payload sizes above 200 bytes. Additionally or alternatively, the first HDBaseT adaptor may be configured to segment the USB data packet into at least six HDBaseT packets, from which at least two HDBaseT packets have payload sizes below 100 bytes, and at least four HDBaseT packets have payload sizes above 100 bytes. Still additionally or alternatively, the first HDBaseT adaptor may be configured to segment the USB data packet into at least seven HDBaseT packets, from which at least three HDBaseT packets have payload sizes below 80 bytes, and at least four HDBaseT packets have payload sizes above 100 bytes. Optionally, the first HDBaseT adaptor is further configured to encode P1 with PAM8 and to encode P3 with PAM4. The combination of both reducing the payload size and lowering the PAM of P3 relative to P1 significantly reduces the probability of having to retransmit P3, which reduces the total latency of transmitting the USB packet over the HDBaseT network. Additionally or alternatively, the first HDBaseT adaptor is further configured to encode P1 and P3 with PAM4 and to encode P2 with PAM8, or to encode P1 and P3 with PAM8 and to encode P2 with PAM16. Additionally or alternatively, P1 and P3 are the first and last HDBaseT packets segmented from the USB packet, and the method further includes encoding P1 and P3 with PAM4, and encoding P2 with PAM8. In this embodiment, P1 carries the USB header (Sync field and Packet ID), and P3 carries the USB tail (16 bits Cyclic Redundancy Checks and End of packet). The USB headers are more sensitive to errors than the USB payload carried by P2, therefore P1 and P3 are encoded with PAM4 in order to improve the robustness of the HDBaseT network, while encoding P2 with PAM8 increases the transmission efficiency over the HDBaseT network. Optionally, the HDBaseT packets further comprise packet P0 that carries the header of the USB data packet, and the first HDBaseT adaptor is further configured to encode P0 with PAM4 and to encode P1, P2 and P3 with PAM8, or to encode P0 with PAM8 and to encode P1, P2 and P3 with PAM16, or to encode P0 with PAM4 and to encode P1 and P2 with PAM16 and to encode P3 with PAM8. Optionally, the USB data packet is a USB3.x data packet, the length of the HDBaseT network is between 10 and 50 meters, and the bandwidth of the HDBaseT network is high enough to ensure that a retransmission of P1 is completed before the transmission of P3 begins. Optionally, the first HDBaseT adaptor is further configured to determine the size of the last two HDBaseT packets, segmented from the USB data packet, as a function of bit error rate (BER) of the HDBaseT network, such that the last two HDBaseT packets are shorter when the BER is above 0.1% compared to when the BER is below 0.001%. Optionally, the first HDBaseT adaptor is further configured to determine the size of the last two HDBaseT packets, segmented from the USB data packet, as a function of the propagation latency of the HDBaseT network, such that the last two HDBaseT packets are shorter when the propagation latency exceeds 150 nanoseconds compared to when the propagation latency is below 50 nanoseconds. Optionally, the HDBaseT network is short enough and features such a low latency that a retransmission of P1 is completed before the sending of P3 begins. By starting to segment the payload of the USB packet into multiple HDBaseT packets before completely receiving the USB packet, it is possible to leverage the higher bandwidth of the HDBaseT network relative to USB3. For example, a certain retransmission over the HDBaseT network adds a delay of less than two microseconds, which means that the retransmission of the first HDBaseT packet (segmented from the start of the USB packet) may be completed before receiving the last byte of the USB packet. Optionally, the first HDBaseT adaptor is further configured to segment the USB data packet such that the average size of the first half of the multiple HDBaseT packets, excluding the first HDBaseT packet, is greater by more than 20% compared to the average size of the second half of the multiple HDBaseT packets, excluding the last HDBaseT packet. Optionally, the first HDBaseT adaptor is further configured to segment the USB data packet such that the average size of the first third of the multiple HDBaseT packets, excluding the first HDBaseT packet, is greater by more than 30% compared to the average size of the last third of the multiple HDBaseT packets, excluding the last HDBaseT packet. And optionally, the first HDBaseT adaptor is further configured to begin segmenting the USB data packet into the multiple HDBaseT packets before completely receiving the USB data packet.

The elements used by the embodiments may be implemented in various ways, such as using a processor. A "processor" may refer to one or more of the following components: a general-purpose processing device, a microprocessor, a central processing unit, a complex instruction set computing (CISC) microprocessor, a reduced instruction set computing (RISC) microprocessor, an application specific integrated circuit (ASIC), a field programmable gate array (FPGA), a digital signal processor (DSP), a dedicated VLSI design ASIC or FPGA, and/or a network processor.

Elements, such as modules utilized by the systems described herein, may be implemented utilizing a combination that includes one or more of the following hardware, firmware, and software elements: ASIC, FPGA, processors, memory blocks, discrete circuits, integrated circuits, a processor to execute commands stored in at least one memory block, a non-transitory computer-readable medium comprising computer-executable instructions that when executed on a computing device cause the computing device to perform certain operations, a processor and a computer readable storage medium comprising a program of instructions executable by the processor wherein when the instructions are executed the processor perform certain operations, a computer system comprising one or more processing units and memory storing one or more programs configured for execution by the one or more processors units wherein the one or more programs include instructions for certain operations, a system comprising a data processing apparatus and a non-transitory computer readable medium storing instructions executable by the data processing apparatus and that upon such execution cause the data processing apparatus to perform certain operations. Buffers may be implemented using memory to store the data, and processor to access the data over a communication channel, such as a parallel bus or a serial bus.

Figure 10A:
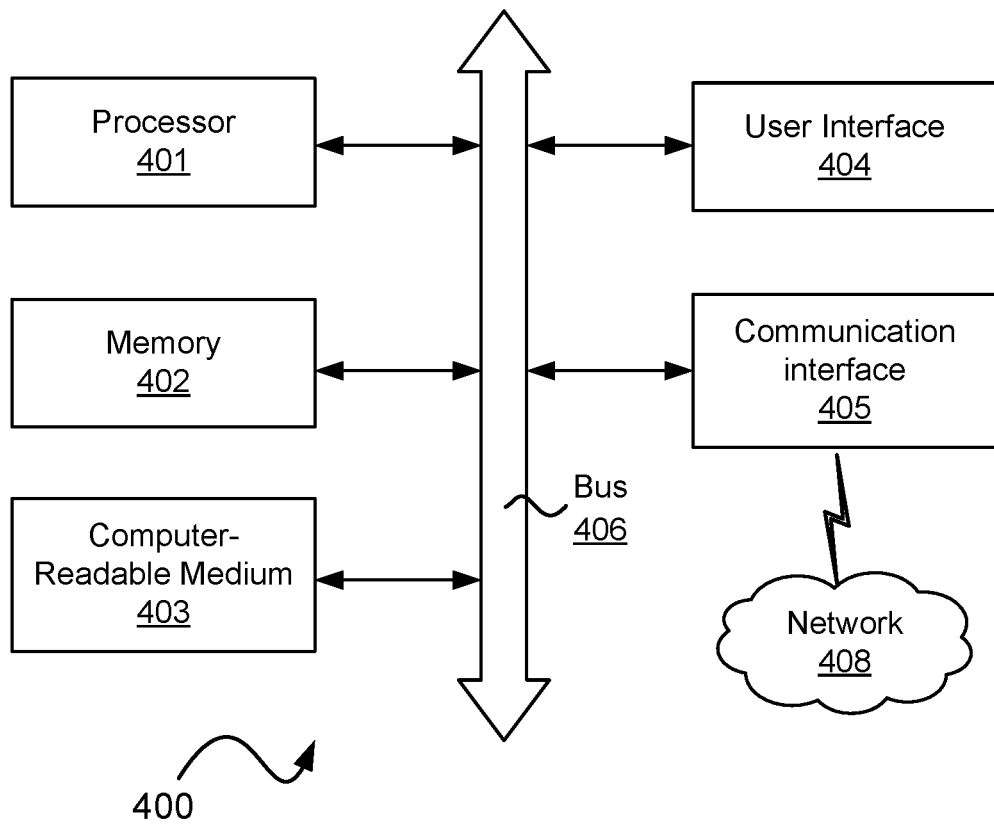
FIG. 10A and FIG. 10B are schematic illustrations of possible embodiments of computers.
Figure 10B:
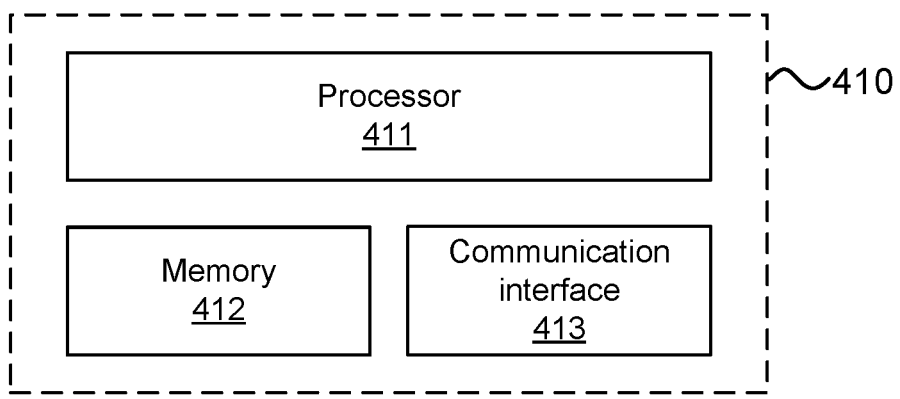

FIG. 10A and FIG. 10B are schematic illustrations of possible additional or alternative embodiments of computers (400, 410) that are able to realize one or more of the embodiments discussed herein that include a "computer" and/or a "processor" coupled to a memory and a communication interface. The computer (400, 410) may be implemented in various ways, such as, but not limited to, a microcontroller, a computer on a chip, a system-on-chip (SoC), a system-on-module, a processor with its required peripherals, a server computer, a client computer, a personal computer, a cloud computer, a network device, a communication device, a handheld device, a wearable device, and/or any other computer form capable of executing a set of computer instructions. Further, references to a computer or a processor include any collection of one or more computers and/or processors (which may be at different locations) that individually or jointly execute one or more sets of computer instructions. This means that the singular term "computer" is intended to imply one or more computers, which jointly perform the functions attributed to "the computer". The computer 400 includes one or more of the following components: processor 401, memory 402, computer readable medium 403, user interface 404, communication interface 405, and bus 406. The computer 410 includes one or more of the following components: processor 411, memory 412, and communication interface 413.

Functionality of various embodiments may be implemented in hardware, software, firmware, or any combination thereof. If implemented at least in part in software, implementing the functionality may involve a computer program that includes one or more instructions or code stored or transmitted on a computer-readable medium and executed by one or more processors. Computer-readable media may include computer-readable storage media, which corresponds to a tangible medium such as data storage media, or communication media including any medium that facilitates transfer of a computer program from one place to another. Computer-readable medium may be any media that can be accessed by one or more computers to retrieve instructions, code, data, and/or data structures for implementation of the described embodiments. A computer program product may include a computer-readable medium. In one example, the computer-readable medium 403 may include one or more of the following: RAM, ROM, EEPROM, optical storage, magnetic storage, biologic storage, flash memory, or any other medium that can store computer readable data.

While the methods disclosed herein have been described and shown with reference to particular steps performed in a particular order, it is understood that these steps may be combined, sub-divided, and/or reordered to form an equivalent method without departing from the teachings of the embodiments. Accordingly, unless specifically indicated herein, the order and grouping of the steps is not a limitation of the embodiments. Furthermore, methods and mechanisms of the embodiments will sometimes be described in singular form for clarity. However, some embodiments may include multiple iterations of a method or multiple instantiations of a mechanism unless noted otherwise. For example, when a processor is disclosed in one embodiment, the scope of the embodiment is intended to also cover the use of multiple processors. Certain features of the embodiments, which may have been, for clarity, described in the context of separate embodiments, may also be provided in various combinations in a single embodiment. Conversely, various features of the embodiments, which may have been, for brevity, described in the context of a single embodiment, may also be provided separately or in any suitable sub-combination. Embodiments described in conjunction with specific examples are presented by way of example, and not limitation.

Herein, references to "one embodiment" mean that the feature being referred to may be included in at least one embodiment of the invention. Moreover, separate references to "one embodiment" or "some embodiments" in this description do not necessarily refer to the same embodiment. Additionally, references to "one embodiment" and "another embodiment" may not necessarily refer to different embodiments, but may be terms used, at times, to illustrate different aspects of an embodiment.

The embodiments may include any variety of combinations and/or integrations of the features of the embodiments described herein. Although some embodiments may depict serial operations, the embodiments may perform certain operations in parallel and/or in different orders from those depicted. Moreover, the use of repeated reference numerals and/or letters in the text and/or drawings is for the purpose of simplicity and clarity and does not in itself dictate a relationship between the various embodiments and/or configurations discussed. The embodiments are not limited in their applications to the details of the order or sequence of steps of operation of methods, or to details of implementation of devices, set in the description, drawings, or examples. Moreover, individual blocks illustrated in the figures may be functional in nature and therefore may not necessarily correspond to discrete hardware elements.

It is evident that many alternatives, modifications, and variations will be apparent to those skilled in the art. It is to be understood that other embodiments may be utilized and structural changes may be made without departing from the scope of the embodiments.

What is claimed is:

1. A method for transmitting uneven segments of a data packet over an intermediate communication link, comprising:
   receiving the data packet by a first node;
   segmenting the data packet into N segments, such that size of each of the last two segments is shorter than average size of the previous (N−2) segments;
   encoding the segments such that reliability of each of the last two segments is better than average reliability of the previous (N−2) segments; and
   transmitting the segments, over the intermediate communication link, to a second node.

2. The method of claim 1, wherein the first and second nodes support retransmission, and reliability of each of last three segments is better than average reliability of the previous (N−3) segments, and size of each of the last three segments is shorter than average size of the previous (N−3) segments.

3. The method of claim 1, wherein average size of first N/3 segments, excluding the first segment, is greater by more than 50% compared to average size of third N/3 segments, excluding the last segment.

4. The method of claim 1, wherein average size of first N/3 segments, excluding the first segment, is greater by more than 25% compared to average size of second N/3 segments, that is greater by more than 25% compared to average size of third N/3 segments, excluding the last segment.

5. The method of claim 1, wherein average size of first N/3 segments is greater than average size of second N/3 segments, that is greater than average size of third N/3 segments.

6. The method of claim 1, wherein average reliability of first N/3 segments, excluding the first segment, is worser than average reliability of second N/3 segments, that is worser than average reliability of third N/3 segments, excluding the last segment.

7. The method of claim 1, further comprising beginning the transmitting of the segments before completely receiving the data packet.

8. The method of claim 7, further comprising retransmitting original data of a corrupted segment upon detecting the corrupted segment.

9. The method of claim 8, further comprising reassembling a restored data packet from the segments, and forwarding the restored data packet to its destination after receiving the last segment.

10. The method of claim 8, wherein length of the intermediate communication link is between 10 and 50 meters, and bandwidth of the intermediate communication link is high enough to ensure that a first retransmission of the first segment from the N segment is completed before beginning transmission of the last segment from the N segments.

11. A non-transitory computer readable medium storing one or more computer programs configured to cause a processor-based system to execute steps comprising:
   receiving a data packet by a first node;
   segmenting the data packet into N segments, such that size of each of the last two segments is shorter than average size of the previous (N−2) segments;
   encoding the segments such that reliability of each of the last two segments is better than average reliability of the previous (N−2) segments; and transmitting the segments, over an intermediate communication link, to a second node.

12. A system comprising:
a first node comprising a processor and a transmitter; the first node is configured to:
receive a data packet;
segment the data packet into N segments, such that size of each of the last two segments is shorter than average size of the previous (N−2) segments;
encode the segments such that reliability of each of the last two segments is better than average reliability of the previous (N−2) segments; and
transmit the segments, over an intermediate communication link, to a second node.

13. The system of claim 12, wherein the first and second nodes support retransmission, and the first node is further configured to encode each of last three segments with reliability that is better than average reliability of the previous (N−3) segments.

14. The system of claim 12, wherein average size of first N/3 segments, excluding the first segment, is greater by more than 50% compared to average size of third N/3 segments, excluding the last segment.

15. The system of claim 12, wherein average size of first N/3 segments, excluding the first segment, is greater by more than 25% compared to average size of second N/3 segments, that is greater by more than 25% compared to average size of third N/3 segments, excluding the last segment.

16. The system of claim 12, wherein average size of first N/3 segments is greater than average size of second N/3 segments, that is greater than average size of third N/3 segments.

17. The system of claim 12, wherein the first node is further configured to begin the transmission of the segments before completely receiving the data packet.

18. The system of claim 17, wherein the first node further comprises a receiver, and the first node is further configured to: detect an indication indicative of a corrupted segment, and retransmit to the second node original data of the corrupted segment upon detecting the indication.

19. The system of claim 18, wherein length of the intermediate communication link is between 10 and 50 meters, and bandwidth of the intermediate communication link is high enough to ensure that a first retransmission of the first segment from the N segment is completed before beginning transmission of the last segment from the N segments.

20. The system of claim 18, wherein the first node is a first HDBaseT adaptor configured to receive a stream of USB3.x data packets having the same priority, and to segment each of the USB3.x data packets into N segments; and the second node is a second HDBaseT adaptor configured to reassemble the received segments into a stream of USB3.x data packets, and to forward the stream of USB3.x data packets to a USB port.

* * * * *